(12) United States Patent
Wang et al.

(10) Patent No.: US 8,219,707 B2
(45) Date of Patent: Jul. 10, 2012

(54) STORAGE NETWORK STRUCTURE BASED ON THE PETERSON GRAPH AND DATA READ-WRITE METHOD THEREOF

(75) Inventors: Jinlin Wang, Beijing (CN); Lingfang Wang, Beijing (CN); Jiali You, Beijing (CN); Tingyi Li, Beijing (CN); Xiangdong Qi, Beijing (CN)

(73) Assignees: Institute of Acoustics, Chinese Academy of Sciences, Beijing (CN); Beijing Acell Technology Co., Ltd., Beijing (CN)

( * ) Notice: Subject to any disclaimer, the term of this patent is extended or adjusted under 35 U.S.C. 154(b) by 382 days.

(21) Appl. No.: 12/584,790

(22) Filed: Sep. 11, 2009

(65) Prior Publication Data

US 2010/0077101 A1    Mar. 25, 2010

(30) Foreign Application Priority Data

Sep. 12, 2008   (CN) .......................... 2008 1 0222226

(51) Int. Cl.
   *G06F 15/173* (2006.01)
(52) U.S. Cl. ........ 709/238; 709/239; 709/242; 709/252; 370/255
(58) Field of Classification Search .................. 709/238; 370/252
   See application file for complete search history.

(56) References Cited

U.S. PATENT DOCUMENTS

| | | | |
|---|---|---|---|
| 6,548,747 B2* | 4/2003 | Shibata et al. | 84/609 |
| 7,194,656 B2* | 3/2007 | Hayward | 714/6.23 |
| 7,853,718 B2* | 12/2010 | Ushiyama | 709/242 |
| 2002/0112597 A1* | 8/2002 | Shibata et al. | 84/609 |
| 2003/0041096 A1* | 2/2003 | Johnson | 709/201 |
| 2003/0212942 A1* | 11/2003 | Nagaura et al. | 714/736 |
| 2005/0166086 A1* | 7/2005 | Watanabe | 714/6 |
| 2006/0107100 A1* | 5/2006 | Hayward | 714/6 |
| 2006/0117172 A1* | 6/2006 | Zhang et al. | 713/2 |
| 2007/0094354 A1* | 4/2007 | Soltis | 709/218 |
| 2007/0260772 A1* | 11/2007 | Garmonov et al. | 710/33 |
| 2008/0270704 A1* | 10/2008 | He et al. | 711/129 |
| 2009/0094318 A1* | 4/2009 | Gladwin et al. | 709/203 |
| 2009/0122724 A1* | 5/2009 | Rosenberg | 370/255 |

FOREIGN PATENT DOCUMENTS

JP    2006260334 A   *   9/2006

* cited by examiner

*Primary Examiner* — Wing Chan
*Assistant Examiner* — Razu Miah
(74) *Attorney, Agent, or Firm* — Davis Wright Tremaine LLP

(57) ABSTRACT

A storage network structure comprises a primary distributed storage network (a cluster distributed storage network or a DHT (Distributed Hash Table)-based peer-to-peer storage network) and a Peterson graph-based storage network. The storage network structure provides different reliability classes for applications and combines the advantages of a peer-to-peer based distributed network storage with Peterson graph-based network storage, solve the problem of a large quantity of data migrating by utilizing the better media data migrating non-movable property from the Peterson graph-based network storage, and screen the single failure of the cluster storage structure and avoid performance degradation of peer-to-peer wide area storage by combining with the availability and robustness of Distributed Hash Table.

3 Claims, 2 Drawing Sheets

STORAGE NETWORK STRUCTURE BASED ON THE PETERSON GRAPH AND DATA READ-WRITE METHOD THEREOF

CROSS-REFERENCE TO RELATED APPLICATIONS

This application claims priority to Chinese patent application no. 200810222226.0, filed on Sep. 12, 2008, titled.

TECHNOLOGY FIELD

The present invention involves to a network storage technology in which the distributed storage nodes form the storage, especially involves to a storage network structure based on the Peterson graph and data read-write method thereof which combines the primary distributed storage network with the Peterson graph-based storage network to provide different reliability classes for storage application.

BACKGROUND

Currently, the information technology field has turned from the computing centered architecture to the storage centered architecture, with the result that the massive information is produced with the development of the internet. The mass information must face with several issues, such as processing, storing and sharing, etc. The present invention is to design the methods concerning mass information distributed storage.

Since mid-1980s, the idea of providing the file service with the distributed hosts on the network has been proposed and experimented. Up to now, these attempts has been developed into various open source distributed file systems, such as the well-known LUSTRE file system supported by SUN Microsystem, OPENAFS file system supported by IBM and Google file system developed by Google. These systems are characterized of central storing of file metadata and distributed storing and serving of file data.

From the beginning of 21 century, the systems using peer-to-peer to realize storing emergences, in which the typical systems are OceanStore storage system and Granary storage system. One feature of these systems is to utilize a single distributed hash table structure, to conquer the single fault point, but has the shortcoming of performance that couldn't satisfy the demands of applications.

Additionally, the Peterson graph is a fixed structure consisting of 10 nodes and 13 edges, as FIG. 2 shows. The most significant properties of this graph are each node has degree of 3 and the distance between any two nodes is not more than 2. Therefore, its traditional field is parallel computing, and it has very high reliability.

THE SUMMARY

Considering of the issues aforementioned, the purpose of the present invention is to provide a Peterson graph-based storage network and data read-write method thereof. The said structure combines the scalability of the primary distributed storage network with the reliability of Peterson graph storage network to offer the different reliability classes which may used by storage application, resolves the problem of a large quantization of media data migrating by utilizing the better non-movability of media data which provided by Peterson graph storage network, and avoids the single point of failure of the cluster storage structure and the performance degradation of the peer-to-peer wide area storage by incorporating availability and robustness of the distributed hash table.

In order to realize the aim of the present invention, the Peterson graph-based storage network structure of the present invention is characterized of consisting of a primary distributed storage network and a Peterson graph-based storage network.

The said primary distributed storage network can be a cluster based distributed storage network or a distributed hash table based peer-to-peer storage network, consisting of n (n>10) storage nodes. The said primary distributed storage network satisfies with a certain degree of storage reliability requirements (hereafter referring to $R_{DHT}$) and has its own storage difference ability. Its component and access mechanism may adopt the known systems in the art.

The said Peterson graph-based storage network is formed by 10 nodes being selected from the said storage nodes set according to strategies (such as bandwidth, reliability, processing capacity, degree of node or a function of distance between nodes and storage capacity). As shown in the FIG. 2, the Peterson graph has the regular degree of node, more than or equal to 3 for each node, and the regular hops between nodes, less than or equal to 2 between any two nodes. The data stored by the Peterson graph-based storage network has the better performance such as the certain reliability and migration non-movability.

Additionally, in order to achieve the aims aforementioned of the present invention, the data read-write method of the Peterson graph-based storage network structure described by this invention includes a data writing method and a data reading method performed by applications.

According to the method of the present invention, wherein the said Peterson graph-based storage network structure consists of the primary distributed storage network and the Peterson graph storage network; and the said applications refers to entities except the storage network such as a software, an application program or a client program.

According to the method of the present invention, the said data writing method performed by applications involves the following steps:

1) the step in which the said applications issue a data-write request with QoS parameters, in which the request includes the QoS parameters, the data identity and the data itself, and is in a form of writing (QoS parameters, data identity, data), wherein the said QoS parameters is defined as two types of metrics, the data reliability metric and the data type metric, each of which may be defined into the several classes, and which may be defined as the most significant 16-bit and subsequent 16-bit of one 32-bit word respectively, for the convenience of system implementation, 2) the step in which the said data writing request is received by the said storage network, in which one central node or distributed storage node of the said storage network receives the said data writing request issued from the said applications, wherein the said central node refers to the specific server addressed by the domain name service or the other alternative addressing way and all the data writing requests are sent to it, 3) the step in which the said storage node resolves the said data writing request, including resolving the said QoS parameters into the data reliability metric ($R_{application}$) and the data type metric ($T_{application}$), and 4) the step in which the storage node executes data writing, consisting of the sub-steps of metadata writing and media data writing executed within the primary distributed storage network; and metadata writing and media data writing executed within the Peterson graph storage network if $R_{DHT} < R_{application}$ ($R_{DHT}$ is the reliability metric of primary distributed storage network).

In step 4, in case of performing metadata writing and media data writing so as to store the data within the Peterson graph storage network, it needs to determine whether the nodeids of nodes that will store data are equal between the primary distributed storage network and the Peterson graph storage network, i.e. nodeid (DHT, data_id)=nodeid (Peterson, data_id), wherein nodeid (x, data_id) denotes the nodeid of nodes which store the data whose id is data_id within x type storage. If they are equal, one alternative node (such as a node with a node id closest to the current node) should be chosen from 6 nodes 2 hops away from the current node within the Peterson graph storage network to store data (including metadata and media data). Otherwise, data should be stored on the node computed by the Peterson graph storage network; and in case that $T_{application}$ (for example, it is greater than 5, denoting large media file) belongs to the type of data migration minimization, one node should be chosen from the Peterson graph storage network according to measurement algorithm (such as maximal bandwidth, and minimal latency, etc.) to store the media data.

According to the method of the present invention, the said data reading method includes the following steps:

1) the step in which metadata lookup and location may be concurrently executed within the primary distributed storage network and the Peterson graph storage network so as to avoid one of them to fail, taking the earlier positive reply as the location result;

2) the step of media data reading, in which after obtaining the metadata, in the case that the metadata contains the multiple replication locations of the media data (multiple storage nodes), the performances with respect to the latency and the available bandwidth are compared among the found storage nodes so as to select the maximal node to serve.

Compared with the known structure and methods of storage network in the art, the present invention features in the following merits:

(1) Combining the reliability of the peer-to-peer storage network with the reliability of the Peterson graph storage network to provide the different reliability class for the storage applications;

(2) Resolving the problem of a large quantity of media data migrating by utilizing the better migration non-movability of the media data offered by the Peterson graph storage network; and (3) Masking from the single point failure of the cluster storage structure and the problem that the performance of wide area storage of peer to peer degrades by incorporating the availability and robustness of the distributed hash technology.

DESCRIPTION

By incorporating the figures and the specific applying examples, the storage network structure based on the Peterson graph of the present invention and data read-write method thereof are to describe in detail.

Figure 1:
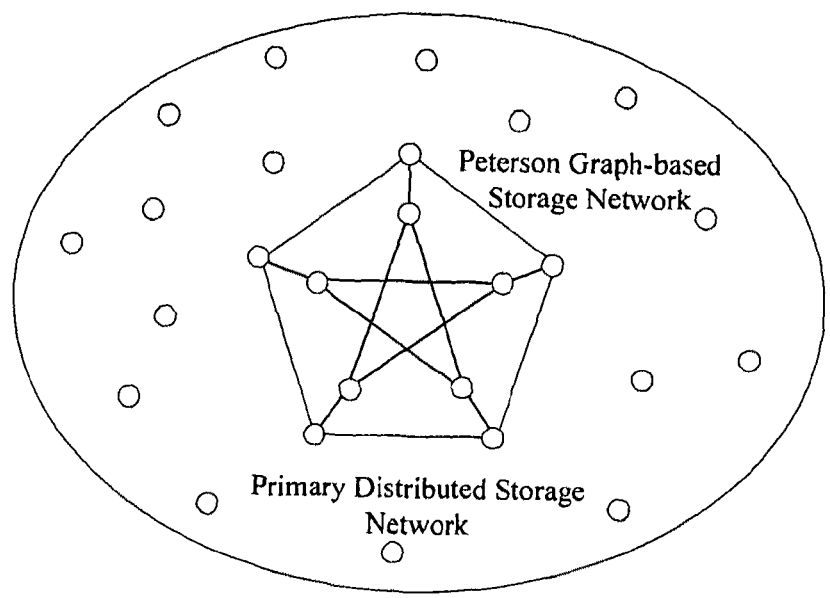
FIG. 1 is the illustration of the storage network structure based on the Peterson graph.

FIG. 1 shows the storage network structure based on the Peterson graph which consists of the primary distributed storage network and the Peterson graph storage network.

According to the storage network structure of the present invention, the said primary distributed storage network is the clustered distributed storage network or the peer-to-peer storage network based on distributed hash table, consisting of n storage nodes. The said primary distributed storage network meets to a certain of storage reliability requirements ($R_{DHT}$) and has its own ability of differentiating storage needs. Its components and access mechanism could be found in the literature, and it doesn't constitute the intended protecting part of this invention, so here ignores its details.

According to the storage network structure of the present invention, the said Peterson graph storage network is formed by 10 nodes (or by configurations) being selected from the storage node set according to the policies such as a function of bandwidth, reliability and storage capacity.

Figure 2:
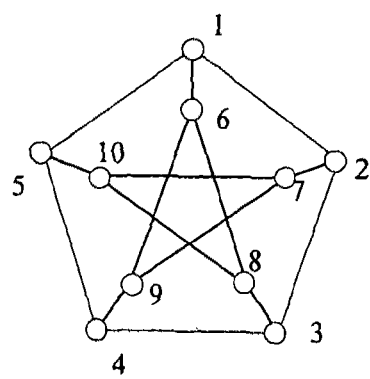
FIG. 2 is the illustration of the nodes numbering of the Peterson graph.

The FIG. 2 illustrates the numbering of the Peterson graph nodes in the FIG. 1. As shown in the FIG. 2, this graph has the better properties of node degree and distance between nodes, as listed in the tables 1 and 2 respectively. As shown in these tables, the degree of each node is 3 and the distance between two nodes is less than or equal to 2. Therefore the data storage of the Peterson graph storage network has the better properties such as the data reliability and data non-movability, etc.

TABLE 1

The degree of each nodes in Peterson graph

| Numbering | Degree |
| --- | --- |
| 1 | 3 |
| 2 | 3 |
| 3 | 3 |
| 4 | 3 |
| 5 | 3 |
| 6 | 3 |
| 7 | 3 |
| 8 | 3 |
| 9 | 3 |
| 10 | 3 |

TABLE 2

The distance between nodes in Peterson graph

| | 1 | 2 | 3 | 4 | 5 | 6 | 7 | 8 | 9 | 10 |
| --- | --- | --- | --- | --- | --- | --- | --- | --- | --- | --- |
| 1 | 0 | 1 | 2 | 2 | 1 | 1 | 2 | 2 | 2 | 2 |
| 2 | 1 | 0 | 1 | 2 | 2 | 2 | 1 | 2 | 2 | 2 |
| 3 | 2 | 1 | 0 | 2 | 2 | 2 | 2 | 1 | 2 | 2 |
| 4 | 2 | 2 | 1 | 0 | 1 | 2 | 2 | 2 | 1 | 2 |
| 5 | 1 | 2 | 2 | 1 | 0 | 2 | 2 | 2 | 2 | 1 |
| 6 | 1 | 2 | 2 | 2 | 2 | 0 | 2 | 1 | 1 | 2 |
| 7 | 2 | 1 | 2 | 2 | 2 | 2 | 0 | 2 | 1 | 1 |
| 8 | 2 | 2 | 1 | 2 | 2 | 1 | 2 | 0 | 2 | 1 |
| 9 | 2 | 2 | 2 | 1 | 2 | 1 | 1 | 2 | 0 | 2 |
| 10 | 2 | 2 | 2 | 2 | 1 | 2 | 1 | 1 | 2 | 0 |

Additionally, the data read-write method of the present invention includes the data writing method and the data reading method used by applications, wherein the said applications may refer to entities except the storage network such as the software, the application program and client program.

According to the method of the present invention, the said data writing method used by the applications involves the following four steps of sending out the data writing request which carries the parameter of the quality of service (QoS) by the application, receiving the data writing request by the storage network, resolving the data writing request and executing data writing.

In particular, the said data writing method includes the steps as follows, 1) the application sends out the data writing request carrying the parameter of the quality of service (QoS parameter), in the form of writing (QoS parameters, data identity, data), wherein the said QoS parameters may be defined as two metrics, the data reliability metrics and the data type metrics, each of which may be defined into the several levels, and is defined as the most significant 16 bits and the subsequent 16 bits of a 32-bit word so as to facilitate the implementation, 2) the storage network receives the data writing request, wherein one central node of the storage network or a node of the distributed storage receives the data writing request sent by the applications, 3) the storage network resolves the data writing request, including resolving the QoS parameters into the data reliability metrics ($R_{application}$) and the data type metrics ($T_{application}$), and 4) the storage network executes data writing involving the step of performing metadata writing and media data writing in the primary distributed storage network; and in performing metadata writing and media data writing in the Peterson graph storage network the case of $R_{DHT} < R_{application}$, wherein, in case of performing the storing operations in the Peterson storage network, it should determine nodeid (DHT, data_id) = nodeid (Peterson, data_) (in which nodeid (x, data_id) denotes the node id of the node storing data with an id of data_id in x storage), wherein if they are equal, the data (including the metadata and the media data) should be stored in one node which is selected from the 6 nodes two hops away from the current node in the Peterson graph, such as the node with the id closest to that of the current node;

and in case that $T_{application}$ (for example, it is greater than 5, and indicates the file of the large media data) is the type of minimization of data migration, one node is chosen from the Peterson graph storage network according to the measurement algorithm (such as maximal bandwidth, and minimal delay, etc.) to store the media data.

Additionally, the said data reading method comprises the steps of searching and locating the metadata, and reading the media data as follow:

1) searching and locating the metadata, which may be executed concurrently in both the primary distributed storage network and the Peterson graph storage network so as to prevent one of them from failing in execution, taking the earliest response as the result; and 2) reading the media data, in which after obtaining the metadata, provided that the obtained metadata contains the multiple locations of media data (the multiple storage nodes), the performances in term of the delay and the available bandwidth, etc. are compared among the found storage nodes, so as to select the optimal node to serve.

The application examples of the Peterson graph-based storage network structure and data read-write method thereof described in this invention are presented as follows.

Example 1

Figure 3:
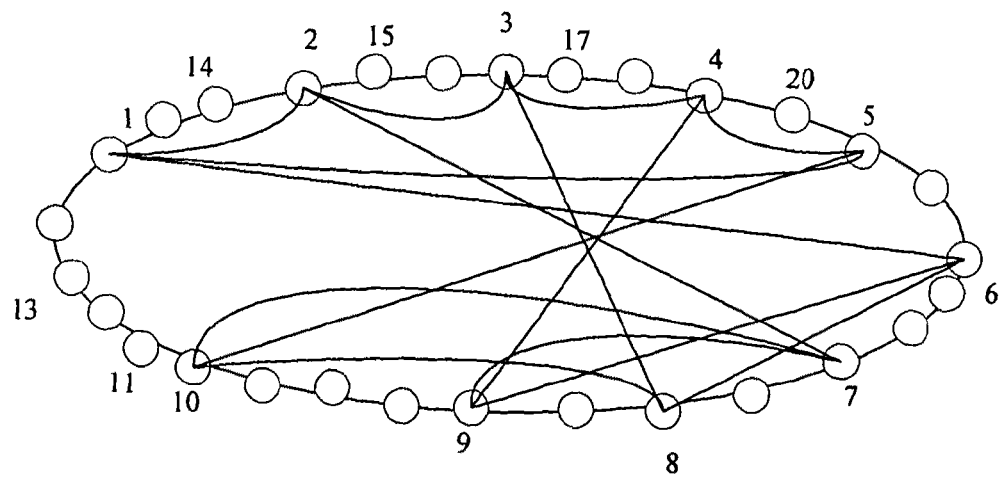
FIG. 3 is the illustration of the distributed hash table storage network structure containing the Peterson graph.
Figure 4:
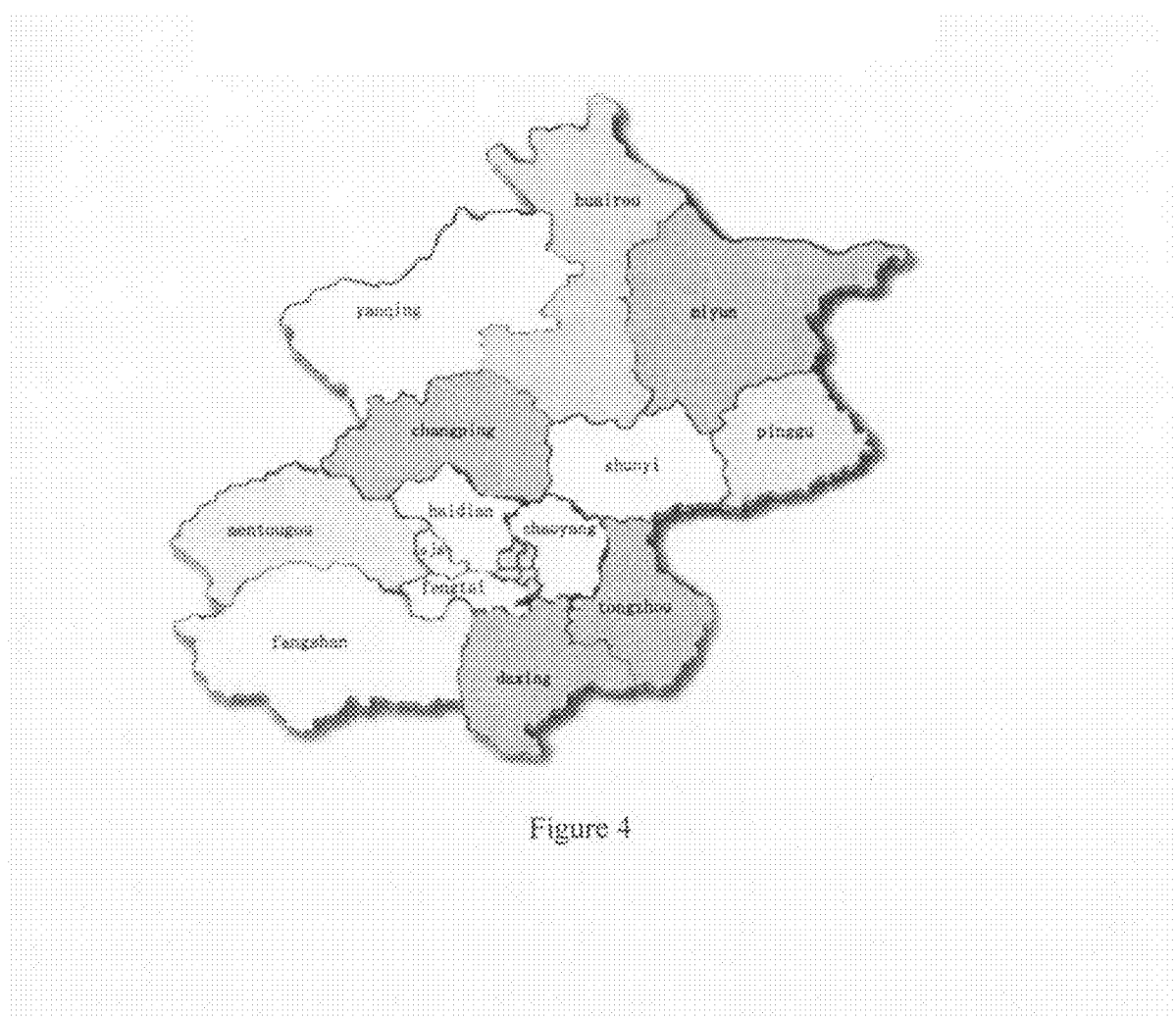
FIG. 4 is the map of the districts of Beijing.

The Peterson graph-based storage network structure and data read-write method thereof are illustrated based on the application scenario as shown in the FIG. 4 assuming that a storage service operation corporation in X city (for example, Beijing) had deployed 30 storage nodes (servers) in its districts (each district has 2 nodes, and there are 15 districts in Beijing), wherein the interface of each node is Ethernet adapter which operates at 1 Gbps, and these storage nodes are connected on IP layer each other, and form a ring as shown in FIG. 3 according to the chord algorithm, and that ten of the deployed nodes with the bandwidth between nodes greater than 500 Mbps had been set to form the Peterson graph structure, numbered as shown in the FIG. 2, and logically connected according to the way shown in the FIG. 2, as shown in FIG. 3. It is assumed that this storage network provides 16 levels of storage reliability (8 levels provided by the distributed storage network, and the other 8 levels provided by both the distributed storage network and the Peterson graph storage network) and two classes of data storage (the common file and the large media file).

The data read-write method of the example 1 is illustrated based on the FIG. 3 in the cases of the common data read-write and the large media data read-write, respectively.

The data read-write method of the present invention determines whether to store data in the Peterson graph storage network or not, depending on the requirements of storage reliability level and the file type metrics. In this example, the level of storage reliability in the distributed storage network may be defined as 5, and the levels above 5 are stored by the Peterson graph storage network. Additionally, as concerning the file type, it could be identified depending on the digits as well. For example, the data with the file type greater than or equal to 6 should be stored in the Peterson graph storage network.

(1) Read and Write the Common Data:

Firstly, the method of data writing is described assuming that a client invokes an operation of writing a common file (e.g. example1.doc) with QoS parameters such as the reliability level 2 and common file type. In the distributed storage network, the storage node to store the metadata of example1.doc should be determined firstly (assuming the node with nodeid 11), then the data id (e.g. 3428) is obtained by calculating the exclusive OR of the words in content and checksum based on the content of example1.doc, assuming that the node 17 is to store the data with the dataid 3428, so that the data of example1.doc provided by the client is stored in node 17, and the node 11 records the node 17 in the metadata of example1.doc.

The Method of Reading Data:

Assuming that a client would read the file of example1.doc, the request of reading example1.doc is filed to search concurrently in the distributed storage network and the Peterson graph storage network. According to the result of data writing, the node 11 is found to store the metadata of example.1doc only in the distributed storage network, and searching in the Peterson storage network failed so as to read the data from the node 17 stored the content of example1.doc by resolving the metadata.

(2) Read and Write the Large Media Data:

First, the method of data writing is described, assuming that a client invokes an operation of writing a large file (e.g. example2.vob with the size of 4 Giga bytes) with QoS parameters such as the reliability level 9 and large file type. In the distributed storage network, the storage node to store the metadata of example2.vob should be determined firstly (assuming the node with nodeid 13), then by calculating the exclusive OR of the words in content and checksum based on the content of example2.vob, the data id is obtained (assuming to split the content into 4 segments with the segment size of 1 Gigabytes and the data ids of 1236, 3428, 4590 and 6571 respectively). Assuming that the nodes 14, 15, 17, and 20 should store the corresponding data with the ids of 1236, 3428, 4590 and 6571 respectively, the data of example2.vob provided by the client is stored the in nodes 14, 15, 17, and 20, and the node 13 records the nodes 14, 15, 17, and 20 in the metadata of example2.vob.

Additionally, the file of example2.vob is determined to be stored in the Peterson storage network as well, according to the reliability level 9 and large file type, and to store the metadata of example2.vob in the node 5 by calculating the hash function on the file name. Furthermore, the data ids of the content segments of example2.vob are calculated according to the algorithm as described above, so as to assume the segments to be stored in the nodes 1, 3, 7, and 8 depending on them, thus the content of example2.vob is stored in these nodes respectively. Finally, the node 5 records the nodes 1, 3, 7, and 8 in the metadata of example2.vob.

And, the method of reading data is described, assuming that a client would read the file of example2.vob, the request of reading example2.vob is filed to search concurrently in the distributed storage network and the Peterson graph storage network. According to the result of data writing, the node 13, i.e., the nodes 14, 15, 17 and 20 in the distributed storage network and the node 5, i.e. the nodes 1, 3, 7 and 8 in the Peterson storage network are found to store the metadata of example2.vob, following to determine the optimal nodes for segment reading according to the bandwidth and delay respectively, and assumed the nodes 14, 3, 7, and 20, so as to transfer the data from them to the client.

The other content which is technologically implemented for the skilled in the art in the present application isn't described in detail.

The invention claimed is:

1. A data read-write method of a storage network structure based on the Peterson graph, in which said storage network structure based on the Peterson graph includes a primary distributed storage network and a storage network based on the Peterson graph, is characterized by including a method used by applications to write data and a method used by applications to read data, and said method used by the applications to write data includes following steps:

1) said applications send a data-write request including QoS (quality of service) parameters, data identity and data, said QoS parameters defined as two metrics, namely a data reliability metric and a data type metric, each of which may be defined into several levels or classes;

2) said storage network structure receives said data write request, which is received by one central node of the storage network based on the Peterson graph or one node of the distributed storage network, wherein the said central node refers to a specific server addressed by dns (domain name service) or alternatively all data write requests are delivered to this central node;

3) said storage network structure resolves the said data write request, which includes resolving the QoS parameters into the data reliability metric $R_{application}$ and the data type metric $T_{application}$; and 4) said storage network structure executes data-writing, which includes the operations of metadata writing and media data writing by the said primary distributed storage network, wherein in case of $R_{DHT}<R_{application}$, the Peterson graph-based storage network executes both metadata writing and media data writing, where said $R_{DHT}$ is the reliability metric of the primary distributed storage network, wherein the said data read method includes:

1) the step of addressing and locating the metadata, which may be performed simultaneously in the primary distributed storage network and the Peterson graph-based storage network, wherein the node or nodes providing the first returned response is or are identified; and 2) the step of reading the media data, in which after obtaining the metadata, in the case that the media data contains multiple storage nodes, the performances in terms of the delay and available bandwidth among these storage nodes are compared, and the optimal node is chosen to fulfill media data reading.

2. The data read-write method of the storage network structure based on the Peterson graph according to the claim 1 is characterized in that in the said step 1) of the said application data write method, the data reliability metric and the data type metric of the said QoS parameter are defined as the most significant 16 bits and subsequent 16 bits of a 32-bit word, respectively.

3. The data read-write methods of the storage network structure based on the Peterson graph according to the claim 1 is characterized in that, in the said step 4) of the said application data write method, in the case that the Peterson graph-based storage network executes metadata writing and media data writing so as to store the data, it determines whether the node ids of the storage nodes which are responsible for data that will be stored are equal between the primary distributed storage network and the Peterson graph-based storage network, wherein if equal, one of 6 nodes which are two hops away from the current node is selected from the Peterson graph to store data; otherwise, data may be directly stored in the node which is computed from the Peterson graph-based storage network; and in the case that $T_{application}$ is the type of minimal data migration, one node in Peterson graph based storage network is selected according to measurement algorithm to store the media data.

* * * * *